United States Patent [19]

Sawada et al.

[11] Patent Number: 4,842,366
[45] Date of Patent: Jun. 27, 1989

[54] CERAMIC SUPERCONDUCTOR AND LIGHT TRANSMITTING COMPOSITE WIRE

[75] Inventors: Kazuo Sawada; Hajime Hitotsuyanagi; Kengo Ohkura, all of Osaka, Japan

[73] Assignee: Sumitomo Electric Industries, LTD, Osaka, Japan

[21] Appl. No.: 163,585

[22] Filed: Mar. 3, 1988

[30] Foreign Application Priority Data

Mar. 5, 1987 [JP] Japan ................................. 62-051141
Mar. 27, 1987 [JP] Japan ................................. 62-075423

[51] Int. Cl.$^4$ ..................... G02B 6/10; H01L 39/24; H01P 1/00; H01B 5/00
[52] U.S. Cl. ............................. 350/96.30; 350/96.10; 350/96.23; 350/96.33; 350/96.34; 29/599; 505/809; 505/813; 505/826; 505/866; 505/885; 505/886; 505/887; 505/898; 333/995; 174/70 R; 174/125.1; 174/126.1; 174/126.3
[58] Field of Search ............... 350/96.10, 96.11, 96.12, 350/96.29, 96.23, 96.30, 96.33, 96.34; 505/801, 809, 813, 818, 819, 821, 826, 866, 885, 886, 887, 898; 29/599; 204/192 S; 307/462, 476; 333/99 S; 428/378, 379; 427/163; 174/125.1, 126.1, 126.2, 126.3, 70 R

[56] References Cited

U.S. PATENT DOCUMENTS

| | | | |
|---|---|---|---|
| 3,594,226 | 7/1971 | Thomas | 428/367 X |
| 3,603,715 | 9/1971 | Eilhardt et al. | 174/125.1 |
| 3,730,967 | 5/1973 | Nicol | 505/887 X |
| 3,749,811 | 7/1973 | Bogner et al. | 174/126.2 |
| 3,763,552 | 10/1973 | Brown et al. | 29/599 X |
| 3,930,903 | 1/1976 | Randall et al. | 505/813 X |
| 4,093,817 | 6/1978 | Jungst et al. | 174/125.1 |
| 4,101,731 | 7/1978 | Marancik | 29/599 X |
| 4,171,464 | 10/1979 | Steyert, Jr. | 505/887 |
| 4,209,229 | 6/1980 | Rittler | 350/96.34 |
| 4,216,449 | 8/1980 | Küch | 333/242 |
| 4,319,803 | 3/1982 | Burmeister et al. | 350/96.33 |
| 4,395,813 | 8/1983 | Roth et al. | 29/599 X |
| 4,427,263 | 1/1984 | Lagakos et al. | 350/96.33 |
| 4,572,609 | 2/1986 | Sakuragi et al. | 350/96.30 |
| 4,581,289 | 4/1986 | Dietrich et al. | 428/379 |
| 4,585,696 | 4/1986 | Dustmann et al. | 505/813 X |
| 4,650,281 | 3/1987 | Jaeger et al. | 350/96.33 |
| 4,791,241 | 12/1988 | Ando et al. | 174/125.1 |

FOREIGN PATENT DOCUMENTS

| | | | |
|---|---|---|---|
| 1640745 | 10/1970 | Fed. Rep. of Germany | 174/125.1 X |
| 1690075 | 4/1971 | Fed. Rep. of Germany | 428/367 X |
| 60-09011 | 1/1985 | Japan | 174/125.1 X |
| 62-32667 | 2/1987 | Japan | 333/99 S |

OTHER PUBLICATIONS

Bednorz and Muller, "Possible High $T_C$ Superconductivity in the Ba-La-Cu-O System", Z. Phys. B.-Condensed Matter 64, 189–193 (1986).

Primary Examiner—William L. Sikes
Assistant Examiner—Brian M. Healy
Attorney, Agent, or Firm—Pennie & Edmonds

[57] ABSTRACT

A ceramic type superconductive layer (2) is formed on the outer peripheral surface of an optical fiber (1), and a stabilizing layer (3) is formed so that it contacts the outer peripheral surface of the superconductive layer (3). The diameter of the optical fiber is, for example, not more tha 100 μm. The superconductive layer may be formed with a spirally extending groove (7) which divides the superconductive layer.

13 Claims, 2 Drawing Sheets

4,842,366

CERAMIC SUPERCONDUCTOR AND LIGHT TRANSMITTING COMPOSITE WIRE

BACKGROUND OF THE INVENTION

1. Field of the Invention

This invention relates to an electricity-light transmitting composite wire for transmitting both electrical energy and optical signals.

2. Description of the Prior Art

Heretofore, in the field of power transmission, composite of optical fiber and electric wire have been used. In a typical construction, an optical fiber unit formed by gathering a suitable number of optical fibers is positioned at the center and a plurality of metal strands are twisted together around such optical fiber unit.

At present, such composites of optical fiber and electric wire are limited in use to the field of power transmission. It seems that the reason is that composite wires having optical fiber and electric wire compounded together are highly rigid and hence hard to handle and are not so compact in form. Therefore, in the field of power distribution including connection between two parts, they cannot be used as such.

As is known in the art, optical fiber has the merit of being capable of transmitting an extremely high density optical signal despite the fact that it is compact in form. In contrast, in the case of electric wire, when it is desired to transmit high electric energy or to transmit electrical signals or the like over a long distance without suffering much attenuation, it is necessary to correspondingly increase the cross-sectional area of the electric wire. Therefore, in a composite wire of optical fiber and electric wire, if a compact form is to be attained, this involves a reduction in the cross-sectional area of the wire section, entailing a reduction in the amount of electric energy which can be transmitted or attenuation of electric signals to be transmitted.

SUMMARY OF THE INVENTION

Accordingly, this invention is intended to provide an electricity-light transmitting composite wire which is capable of transmitting optical signals and electric energy in a high density manner.

An electricity-light transmitting composite wire according to this invention includes, first, a light transmitting body, such as optical fiber, to transmit optical signals. And a ceramic type superconductor which exhibits superconductive phenomena at an operating temperature is compounded with said light transmitting body.

The compounding manners include one in which the light transmitting body and the superconductor are compounded in a concentric construction and another in which they are compounded in a planar laminated construction.

In this invention, the transmission of optical signals is undertaken by the light transmitting body, while the transmission of electric energy or electric signals is effected by the superconductor.

Thus, according to the invention, the transmission of optical signals in a high density manner is realized by the light transmitting body, while in the superconductor, electric resistance can be made zero. so that even if the cross-sectional area is small, high electric energy or accurate electric signals can be transmitted; such electricity-light transmitting composite wire can be constructed in compact form.

Therefore, the field of application is widened to the extent that it is applicable not only in the field of power transmission but also in the field of power distribution including connection between parts, and since it is made compact in form, it is easier to handle.

In a preferred embodiment, a stabilizing member is incorporated which contacts the superconductor to stabilize the superconductive state.

As for the superconductor, it is preferable to use one whose critical temperature is higher than 77 K (absolute temperature). Thereby, it becomes possible to use liquefied nitrogen (77 K), which is inexpensive, as a refrigerant. Further, there would be a possibility of using a superconductor which exhibits superconductive phenomena at a temperature in the vicinity of normal temperature. Thereby, the refrigerant can be dispensed with, and the composite wire can be prevented from becoming increased in size owing to the refrigerant passage or it becomes possible to use an inexpensive safe refrigerant, such as water.

The superconductors which exhibit relatively high critical temperature described above include a group which is represented by the general formula $A_a B_b C_c$ (where a, b and c are numbers indicating the proportions of composition of A, B and C, respectively), wherein A is at least one member selected from the group consisting of the group Ia, IIa and IIIa elements in the periodic table, B is at least one member selected from the group consisting of the group Ib, IIb and IIIb elements in the periodic table, and C is at least one member selected from the group consisting of oxygen, carbon, nitrogen, fluorine and sulfur. In the above general formula $A_a B_b C_c$, it is preferable that the relation a x (average molecular weight of A) +b x (average molecular weight of B) =c x (average molecular weight of C) hold. Presumably, a ceramic type superconductor having a relatively high critical temperature would have a layer-like perovskite type crystalline structure.

In addition, as for the group Ia elements in the periodic table, mention may be made of H, Li, Na, K, Rb, Cs and Fr. As for the group IIa elements in the periodic table, mention may be made of Be, Mg, Ca, Sr, Ba and Ra. As for the group IIIa elements, mention can be made of Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr.

As for the group Ib elements in the periodic table, mention may be made of Cu, Ag and Au. As for the group IIb elements in the periodic table, mention may be made of Zn, Cd and Hg. As for the group IIIb elements, mention may be made of B, Al, Ga, In and Tl.

As for the A in the above-mentioned general formula $A_a B_b C_c$, preferably it is at least two members selected from the group consisting of the group Ia, IIa and IIIa elements in the periodic table. Further, preferably, the B contains at least copper, and the C contains at least oxygen.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings.

Figure 1:
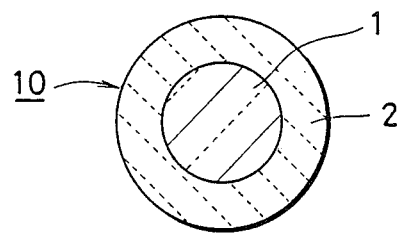
FIG. 1 is an enlarged sectional view showing an embodiment of the invention.

First, an optical fiber 1 having a diameter of 0.5 mm and formed of quartz or fluoride glass, as shown in an enlarged sectional view in FIG. 1, is prepared, and it is coated with 0.2 mm-thick superconductive layer 2. This superconductive layer 2 is made form a ceramic type superconductive material having a composition such as, for example, $(La, Ba)_2CuO_4$, $(La, Sr)_2CrO_4$ or $YBa_2Cu_3O_{7-x}$. Such superconductive layer 2 can be formed as by gas phase process, such as sputtering or CVD, or by the so-called sol-gel process involving condensation of alkoxide.

In addition, a protective layer (not shown) for the optical fiber 1 may be formed between the optical fiber and the super conductive layer 2.

The electricity-light transmitting composite wire 10 shown in FIG. 1, though thin as a whole, is capable of transmitting optical signals and electric energy in the form of power or electric signals in a high density manner or in large amounts.

Figure 2:
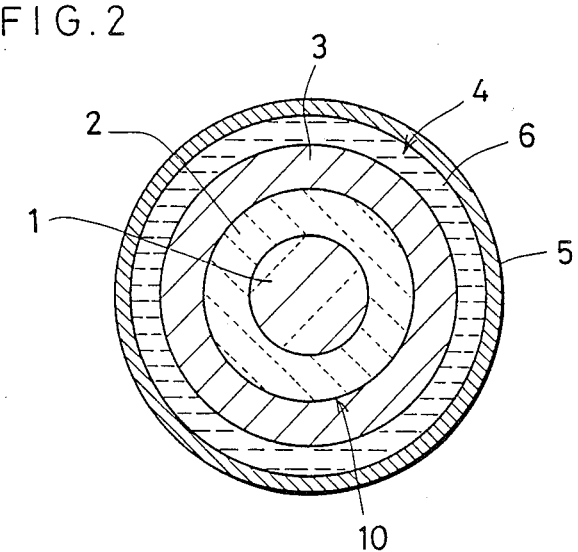
FIG. 2 is an enlarged sectional view showing an stabilizing layer 3 and a pipe 5 added to the electricity-light transmitting composite wire shown in FIG. 1.

FIG. 2 is an enlarged sectional view showing other components added to the composite wire 10 shown in FIG. 1. First, the superconductive layer 2 is coated with high purity copper or aluminum, for example, so as to form a stabilizing layer 3 for stabilizing the superconductive state of the superconductor which forms the super conductive layer 2. And the structure starting with the optical fiber 1 and ending in the stabilizing layer 3 is received in a pipe 5 with a suitable clearance 4 defined therebetween. The clearance 4 serves as a passage for a refrigerant 6 used to cool the superconductor which forms the superconductive layer 2 to its critical temperature to put it in the superconductive state. The pipe 5 itself is preferably formed of a heat insulating material or is coated with a separate heat insulating material (not shown). Further, the pipe 5 performs the function of protecting the optical fiber 1 and the superconductive layer 2.

In the description of the above embodiment, the diameter of the optical fiber 1 is 0.5 mm and the superconductive layer 2 is formed thereon; however, to provide magnetic stabilization of the superconductor forming the superconductive layer 2, it is preferable to reduce the diameter of the optical fiber 1, for example, to not more than 100 μm.

Figure 3:
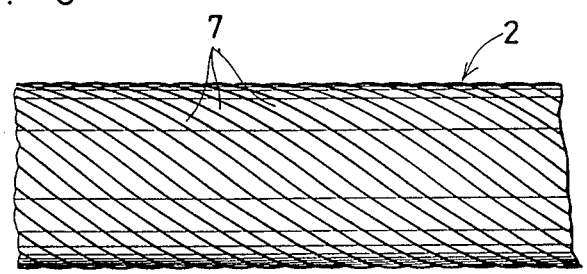
FIG. 3 is a front view showing spiral groves 7 formed in a superconductor layer 2.

As for the means for magnetically stabilizing the superconductive state of the superconductive layer 2, besides the measure of making the diameter of the optical fiber 1 relatively small, a number of spirally extending grooves 7, as shown in FIG. 3, may be formed in the superconductive layer 2 to divide the latter. The dividing of the superconductive layer 2 shown in FIG. 3 may, of course, be effected concurrently with reducing the diameter of the optical fiber 1 to not more than 100 μm as described above.

Figure 4:
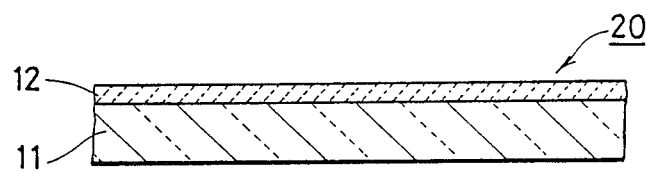
FIG. 4 is an enlarged sectional view showing another embodiment of the invention.

FIG. 4 is an enlarged sectional view showing another embodiment of the invention. The compounding manner of the composite wire 10 shown in FIG. 1 is such that the light transmitting body (optical fiber 1) and the superconductor (superconductive layer 2) are compounded in a concentric construction. In the embodiment shown in FIG. 4, however, the light transmitting body and the superconductor are compounded in a planar laminated construction.

That is, the electricity-light transmitting composite wire 20 shown in FIG. 4 has a light transmitting tape 11 serving as a light transmitting body, and a superconductive layer 12 laminated thereon. In addition, the material of the light transmitting tape 11, and the material of the superconductive layer 12 and the method of producing the same can be made the same as in the electricity-light transmitting composite wire 10 shown in FIG. 1.

Figure 5:
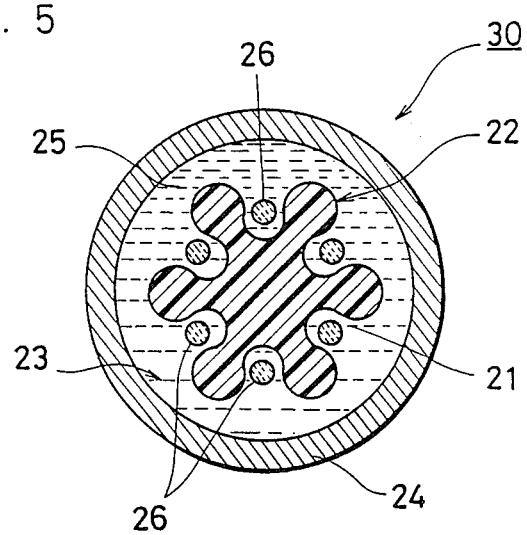
FIG. 5 is an enlarged sectional view showing a further embodiment of the invention.

FIG. 5 is an enlarged sectional view showing a further embodiment of the invention.

In the electricity-light transmitting composite wire 30 shown therein, a reinforcing member 22 formed with a plurality of grooves 21 is disposed at the center. The reinforcing member 22 is made, for example, of fiber-reinforced plastic or metal. The grooves 21 are formed so that they extend spirally on the outer peripheral surface of the reinforcing member 22. The reinforcing member 22 is received in a pipe-like sheathing member 24 with a suitable clearance 23 defined therebetween the clearance 23 serves as a passage for a refrigerant 25 used to cool a superconductor (to be later described) to its critical temperature to put it in the superconductive state.

In addition, if the reinforcing member 22 is made of metal, it itself can be used as a conductor. Further, if a superconductor to be later described is disposed in contact with the reinforcing member 22 while forming the latter of high purity copper or aluminum, then the reinforcing member 22 can be made to function as a stabilizing member for stabilizing the superconductive state of the superconductor.

In the composite wire 30 shown in FIG. 5, there are two possibilities concerning wires denoted by the reference numeral "26" and disposed in the grooves 21 of the reinforcing member 22.

The first possibility is that each wire 26 is in the form of the electricity-light transmitting composite wire 10 shown in FIG. 1. The second possibility is that some of the wires 26 are formed of optical fiber while the others are in the form of wires made of ceramic type superconductor itself. In either case, electric energy or both electric and optical signals can be transmitted.

In the previous description relating to FIG. 1, $(La, Ba)_2CuO_4$, $(La, Sr)_2CuO_4$ and $YBa_2Cu_3O_{7-x}$ have been given as examples of the composition of the superconductor. In this connection, it has been found that a superconductive material which belongs to the third example, or a Y-Ba-Cu-O type superconductor and which has the following composition exhibits a higher critical temperature.

Respective powders of $Y_2O_3$, $BaCO_3$ and $CuO$ were mixed together so that the ratio Y : Ba : Cu was 1 : 2 : 3, and the mixture was then preliminarily sintered. Thereafter, this preliminarily sintered body was crushed, molded at a pressure of 100 bar and fired at 940° C. in the air for 24 hours. The sintered body obtained by such firing exhibited symptoms of superconduction at 90 K. Thus, if this ceramic type superconductive material is used as the superconductive material contained in the superconductive layer 2 or 12 or the wires 26, extremely high operating temperature is available.

In addition, in the composite wire 10 shown in FIG. 1, the superconductive layer 2 has been located outwardly of the optical fiber 1. However, as another embodiment of the invention, the positional relation between the superconductor and the light transmitting body may be reversed.

Further, in FIGS. 1 and 4, a single light transmitting body and a single superconductor have been formed; however, each component may have a laminated construction comprising a plurality of layers.

Although the present invention has been described and illustrated in detail, it is clearly understood that the same is by way of illustration and example only and is not to be taken by way of limitation, the scope of the present invention being limited only by the terms of the appended claims.

What is claimed is:

1. An electricity-light transmitting composite wire comprising light transmitting body means (1, 11, 26) and ceramic type superconductor means (2, 12, 26) exhibiting superconductive phenomena at an operating temperature.

2. An electricity-light transmitting composite wire as set forth in claim 1, wherein said light transmitting body means (1) and said superconductor means (2) are compounded in a concentric construction.

3. An electricity-light transmitting composite wire as set forth in claim 2, wherein said light transmitting body means includes an optical fiber (1), and said superconductor means includes a superconductive layer (2) formed outwardly of the outer peripheral surface of said optical fiber.

4. An electricity-light transmitting composite wire as set forth in claim 3, wherein the diameter of said optical fiber is not more than 100 μm, and said superconductor layer is formed on the outer peripheral surface of said optical fiber.

5. An electricity-light transmitting composite wire as set forth in claim 3, wherein said superconductive layer is formed with a groove (7), whereby said superconductive layer is divided.

6. An electricity-light transmitting composite wire as set forth in claim 1, wherein said light transmitting body means (11) and said superconductor means (12) are compounded in a planar laminated construction.

7. An electricity-light transmitting composite wire as set forth in claim 1, wherein said light transmitting body means and said superconductor means are in the form of separate wires (26), said composite wire further including a long reinforcing member (22), said wires being disposed on said reinforcing member.

8. An electricity-light transmitting composite wire as set forth in claim 1, further including a stabilizing member (3) contacting said superconductor means (2) for stabilizing the superconductive state of said superconductor means.

9. An electricity-light transmitting composite wire as set forth in claim 1, further including pipe means (5) which receives said superconductor body means and provides a refrigerant passage.

10. An electricity-light transmitting composite wire as set forth in claim 1, wherein the superconductor constituting said superconductor means is represented by the general formula $A_aB_bC_c$ (where a, b and c are numbers indicating the proportions of composition of A, B and C, respectively), wherein A is at least one member selected from the group consisting of the group Ia, IIa and IIIa elements in the periodic table, B is at least one member selected from the group consisting of the group Ib, IIb and IIIb elements in the periodic table, and C is at least one member selected from the group consisting of oxygen, carbon, nitrogen, fluorine and sulfur.

11. An electricity-light transmitting composite wire as set forth in claim 10, wherein said A is at least two members selected from the group consisting of group Ia, IIa and IIIa elements in the periodic table.

12. An electricity-light transmitting composite wire as set forth in claim 10, wherein said B includes copper, and said C includes oxygen.

13. An electricity-light transmitting composite wire as set forth in claim 1, wherein said superconductive body has a layer-like perovskite construction.

* * * * *